United States Patent
Hendrie et al.

(10) Patent No.: US 10,002,001 B1
(45) Date of Patent: Jun. 19, 2018

(54) IMPORTING A VIRTUAL DISK IMAGE INTO A COMPUTE SERVICE ENVIRONMENT

(71) Applicant: Amazon Technologies, Inc., Reno, NV (US)

(72) Inventors: Christopher Ian Hendrie, Centreville, VA (US); Bashuman Deb, Herndon, VA (US); Paul John Tillotson, Herndon, VA (US)

(73) Assignee: Amazon Technologies, Inc., Reno, NV (US)

(*) Notice: Subject to any disclaimer, the term of this patent is extended or adjusted under 35 U.S.C. 154(b) by 611 days.

(21) Appl. No.: 13/770,992

(22) Filed: Feb. 19, 2013

(51) Int. Cl.
- G06F 9/44 (2018.01)
- G06F 12/06 (2006.01)
- G06F 3/06 (2006.01)

(52) U.S. Cl.
CPC ........ G06F 9/4401 (2013.01); G06F 12/0646 (2013.01); G06F 12/0692 (2013.01); *G06F 3/0629* (2013.01); *G06F 3/0661* (2013.01)

(58) Field of Classification Search
CPC .... G06F 9/4401; G06F 3/0601; G06F 3/0676; G06F 3/0638; G06F 3/0629; G06F 3/0661; G06F 2220/20; G06F 2003/0692; G06F 17/30091; G06F 12/0646; G06F 12/0692; G11B 27/329
See application file for complete search history.

(56) References Cited

U.S. PATENT DOCUMENTS

| | | | | |
|---|---|---|---|---|
| 7,356,679 B1 * | 4/2008 | Le | ..................... | G06F 17/30067 707/E17.01 |
| 8,171,201 B1 * | 5/2012 | Edwards, Sr. | ...... | G06F 9/45558 711/112 |
| 2003/0177300 A1 * | 9/2003 | Lee | ..................... | G06F 12/0246 711/103 |
| 2005/0172111 A1 * | 8/2005 | Marcak | ................. | G06F 3/0607 713/1 |
| 2006/0085628 A1 * | 4/2006 | Brcin | ..................... | G06F 9/4406 713/1 |
| 2010/0107163 A1 * | 4/2010 | Lee | ..................... | G06F 9/45533 718/1 |
| 2011/0119668 A1 * | 5/2011 | Calder | ................. | G06F 3/0604 718/1 |
| 2012/0066446 A1 * | 3/2012 | Sabjan | ................ | G06F 11/1662 711/112 |
| 2013/0262801 A1 * | 10/2013 | Sancheti | ................. | G06F 3/065 711/162 |
| 2013/0332924 A1 * | 12/2013 | Shaposhnik | ............ | G06F 21/57 718/1 |

* cited by examiner

*Primary Examiner* — Mano Padmanabhan
*Assistant Examiner* — William E. Baughman
(74) *Attorney, Agent, or Firm* — Klarquist Sparkman, LLP

(57) ABSTRACT

The embodiments herein allow importation of a disk image (real or virtual) into a compute service environment. Any imported disk image can be reconfigured into a geometry compatible with the compute service environment into which it is imported. The reconfiguration can be accomplished through modifying the C, H, and S address values in the master boot record in order to match the virtualized disk environment.

22 Claims, 6 Drawing Sheets

IMPORTING A VIRTUAL DISK IMAGE INTO A COMPUTE SERVICE ENVIRONMENT

BACKGROUND

Storage devices, like fixed disks or removable drives, are usually divided into partitions. A Master Boot Record (MBR) is a special type of boot sector at the very beginning of the partitioned storage device intended for use with IBM PC-compatible systems. The MBR can include a partition table describing how the logical partitions, containing file systems, are organized on that medium. The MBR itself is not located in a partition; it is located at a first sector of the device (physical offset 0), preceding the first partition. The MBR functions as an operating system independent chain boot loader in conjunction with each partition's Volume Boot Record (VBR).

The partition table generally includes two types of addressing schemes. A first type is a Cylinder-Head-Sector (CHS) addressing scheme, which is becoming antiquated and no longer has a direct physical relationship with data stored on the latest-developed disks. The second type of addressing is Logical Block Addressing (LBA), which is a simple linear addressing scheme in which blocks are located by an integer index, with the first block being LBA 0, the second LBA 1, and so on.

Virtual environments have virtualized storage devices that mimic physical storage devices. The virtualized storage devices are partitioned and include an MBR. However, importation of storage devices into a virtual environment can be difficult, especially if the disk geometries are dissimilar.

DETAILED DESCRIPTION

The embodiments herein allow importation of a disk image (real or virtual) into a compute service environment. Certain classes of operating systems are unable to boot unless the C, H, S address values from the master boot record are compatible with the Number-of-Heads and Number-of-Sectors provided by the virtualized disk environment in which the operating system is running. Thus, any imported disk image can be reconfigured into a geometry compatible with the compute service environment into which it is imported. The reconfiguration can be accomplished through modifying the C, H, and S address values in the master boot record in order to match the virtualized disk environment.

Figure 1:
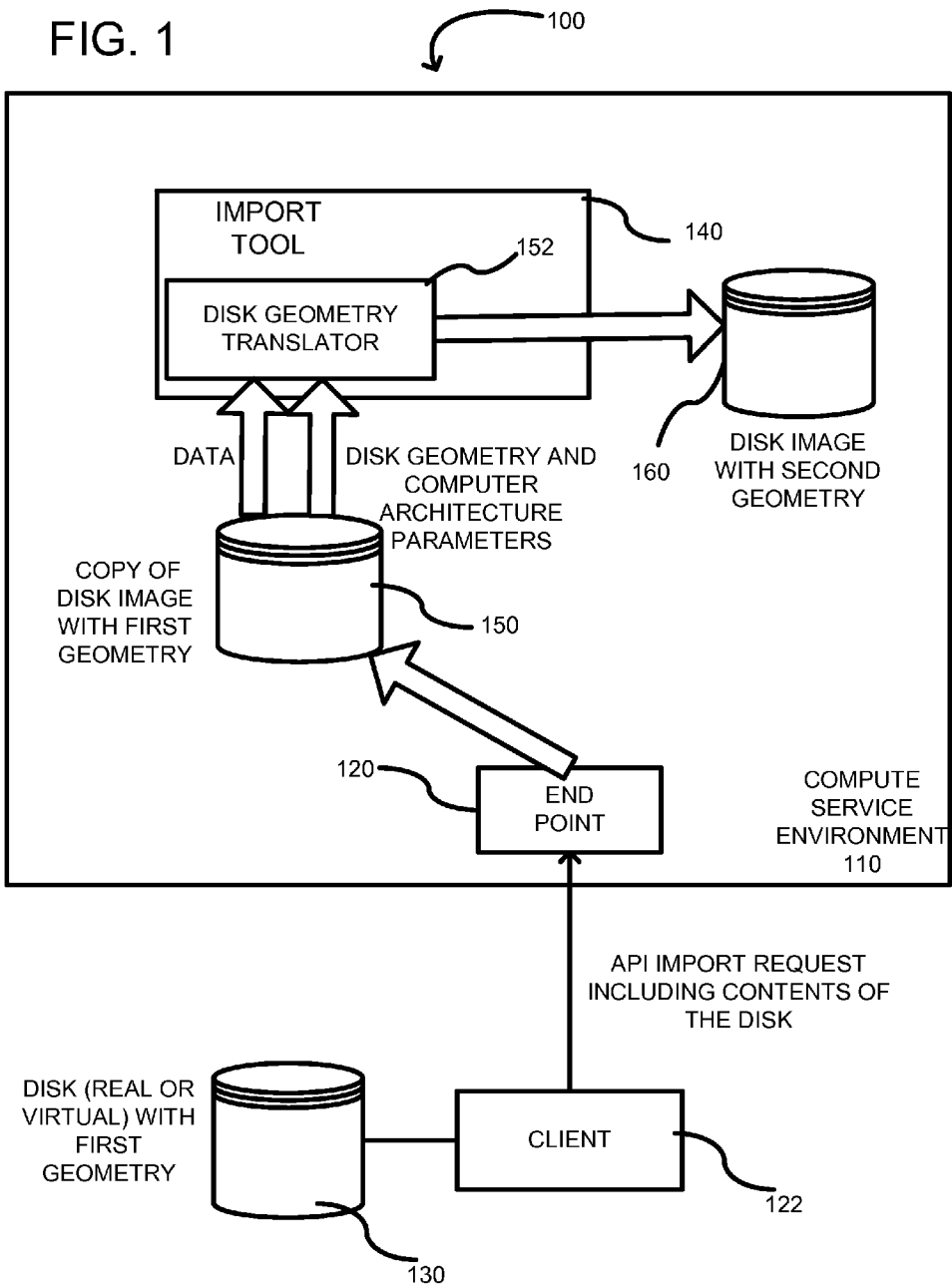
FIG. 1 is a system view of a compute service environment in which a disk is imported using an API request.

FIG. 1 provides an overall system view 100 where importation of a disk image can be performed. The compute service environment 110 includes an endpoint 120, which is a DNS address designed to receive and process API requests, such as from an external client 122. A particular API request of interest is an API importation request including contents of a disk image associated with a real or virtual disk 130. The disk 130 has a first geometry meaning that it has a particular cylinder-head-sector (CHS) addressing scheme. The compute service environment 110 supports a second geometry, which can differ from the first geometry. An import tool 140 can be used to move large amounts of data into the compute service environment 110. A copy 150 of the disk 130 can be created in the compute service environment 110 as a result of the API import request. The import tool 140 can include a disk geometry translator 152 that reads the copy 150 and makes a determination whether the disk geometry associated with the copy 150 is compatible with the disk geometry supported by the compute service environment 110. Such a determination can be made by reading the disk geometry and computer architecture parameters from the disk 150 and making a determination whether the CHS addresses correspond with linear addresses assuming a second geometry supported by the compute service environment. If the disk geometry is compatible with the compute service environment, then the disk geometry translator 152 need not perform any further translation. However, if the geometries are incompatible, then the disk geometry translator 152 converts the copy of the disk 150 to a disk image 160 with a second disk geometry. As further described below, the conversion from one geometry to another is accomplished by modifying at least a partition table of the disk 150. Data sections of the virtual disk 150 can simply be copied over without remapping the addresses. When the virtual disk 160 with the second geometry is generated, the importation process is complete.

Although FIG. 1 shows a copy of the disk image 150, in alternative embodiments, the disk image 130 can directly pass from the end point 120 to the disk geometry translator 152 so as to avoid the need for an additional copy of the disk image. Additionally, although a single API is shown with an import request, there can be multiple associated APIs, such as a first API for generating a copy of the disk image 150 and a second API for generating the disk image 160 with the second geometry. If desired, the compute service environment 110 can associate the disk image 160 to a particular customer account so that it can be used by one or more instances provided to the customer by the compute service environment 110.

Figure 2:
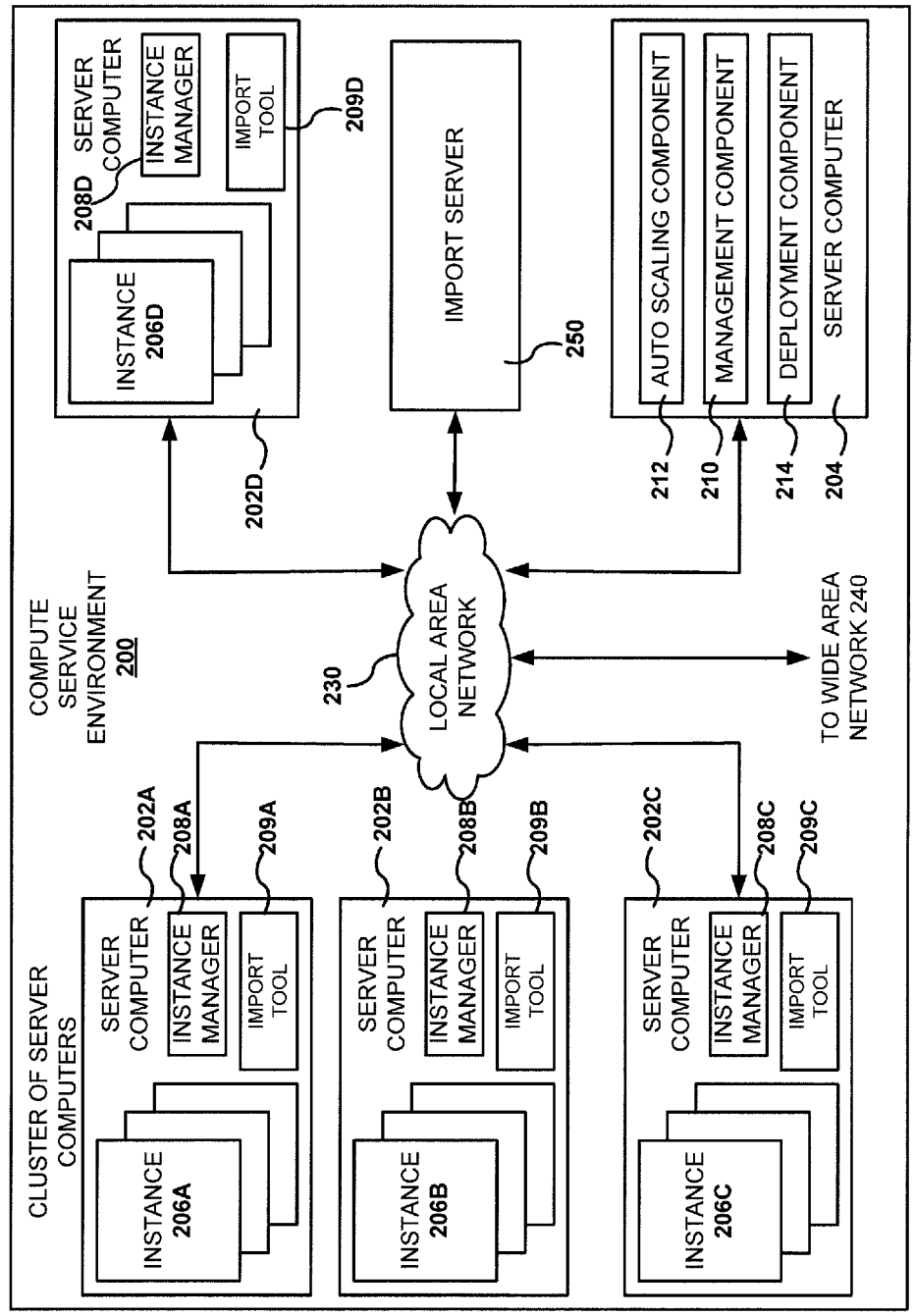
FIG. 2 is an exemplary compute service environment in which an import tool can be provided as a service.

FIG. 2 is a computing system diagram of a network-based compute service environment 200 that illustrates one environment in which the import tool can be used. By way of background, the compute service environment 200 (i.e., the cloud provider) is capable of delivery of computing and storage capacity as a service to a community of end recipients. The compute service environment supports a multi-tenant environment, wherein a plurality of customers operate independently. Generally speaking, the compute service environment 200 can provide the following models: Infrastructure as a Service, Platform as a Service, and/or Software as a Service (SaaS). Other models can be provided. For the IaaS model, the compute service environment 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service environment platform without the cost of buying and managing the underlying hardware and software. The SaaS model allows installation and operation of application software in the compute service environment. In some embodiments, end users access the compute service environment 200 using networked client devices, such as desktop computers, laptops, tablets, smartphones, etc. running web browsers or other lightweight client applications. Those skilled in the art will recognize that the compute service environment 200 can be described as a "cloud" environment.

The particular illustrated compute service environment 200 includes a plurality of server computers 202A-202D. While only four server computers are shown, any number can be used, and large centers can include thousands of server computers. The server computers 202A-202D can provide computing resources for executing software instances 206A-206D. In one embodiment, the instances 206A-206D are virtual machines. As known in the art, a virtual machine is an instance of a software implementation of a machine (i.e. a computer) that executes applications like a physical machine. In the example of virtual machine, each of the servers 202A-202D can be configured to execute an instance manager 208 capable of executing the instances. The instance manager 208 can be a hypervisor or another type of program configured to enable the execution of multiple instances 206 on a single server. Additionally, each of the instances 206 can be configured to execute one or more applications. Import tools 209 can be an instance available for importing data into a compute service environment and can be a service associated with the compute service environment 200. In an alternative embodiment, the import tool can be positioned on an import server 250, much like the management component 210, the auto scaling component 212, and the deployment component 214.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

A server computer 204 can be reserved for executing software components for managing the operation of the server computers 202 and the instances 206, 209. For example, the server computer 204 can execute a management component 210. A customer can access the management component 210 to configure various aspects of the operation of the instances 206 purchased by the customer. For example, the customer can purchase, rent or lease instances and make changes to the configuration of the instances. The customer can also specify settings regarding how the purchased instances are to be scaled in response to demand. An auto scaling component 212 can scale the instances 206 based upon rules defined by the customer. In one embodiment, the auto scaling component 212 allows a customer to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist customers in the deployment of new instances 206 of computing resources. The deployment component can have access to account information associated with the instances, such as who is the owner of the account, credit card information, country of the owner, etc. The deployment component 214 can receive a configuration from a customer that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the customer-provided configuration and cache logic to configure, prime, and launch new instances 206. The configuration, cache logic, and other information may be specified by a customer using the management component 210 or by providing this information directly to the deployment component 214.

A network 230 can be utilized to interconnect the server computers 202A-202D and the server computer 204, 250. The network 230 can be a local area network (LAN) and can be connected to a Wide Area Network (WAN) 240 so that end users can access the compute service environment 200. It should be appreciated that the network topology illustrated in FIG. 2 has been simplified and that many more networks and networking devices can be utilized to interconnect the various computing systems disclosed herein.

Figure 3:
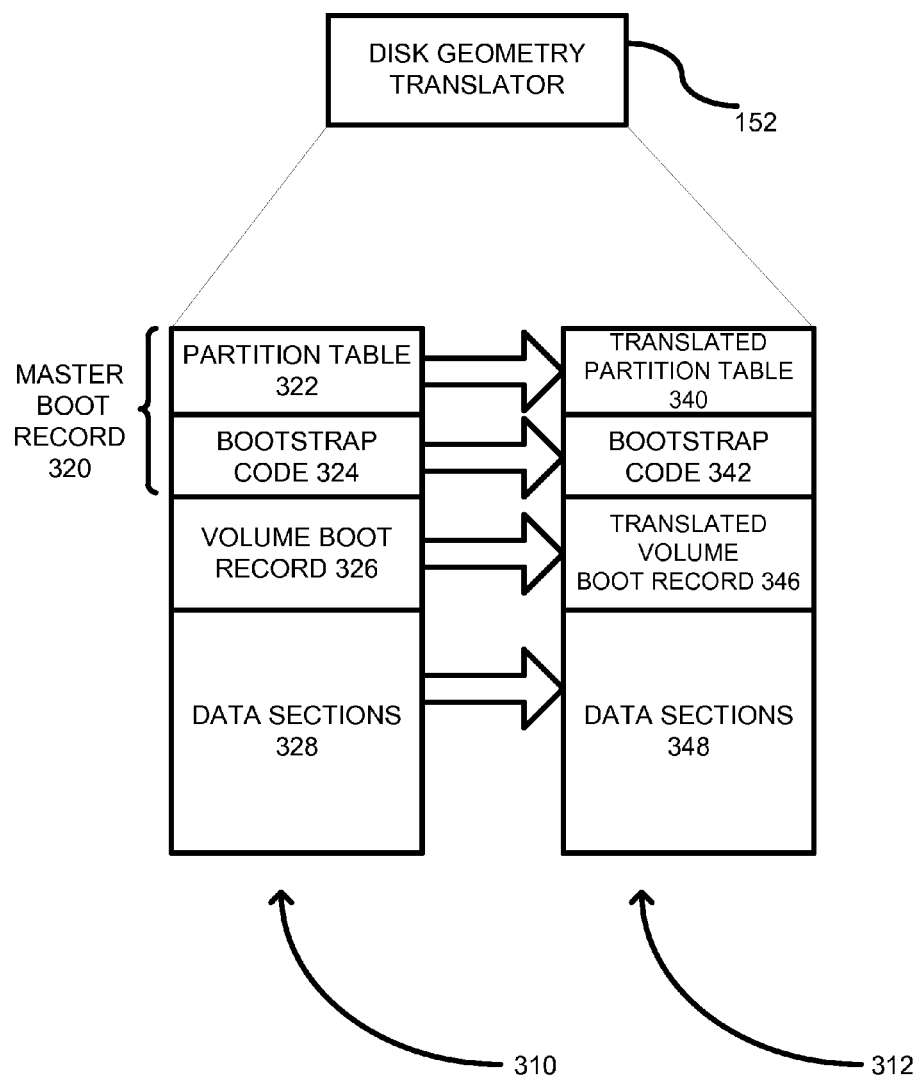
FIG. 3 is an example of a disk geometry translator that modifies the partition table and the volume boot record to conform to the compute service environment.

FIG. 3 shows an example of how the disk geometry translator 152 translates from a first disk image 310 having a first geometry to a second disk image 312 having a second geometry. The first disk image 310 includes a Master Boot Record (MBR) 320 having a partition table 322 and bootstrap code 324. The partition table 322 includes CHS addresses and corresponding linear addresses associated with partitions in the disk image 310. A volume boot record 326 can be positioned after the MBR, as is well understood in the art. Data sections 328 represent the partitioned data stored in accordance with the first disk geometry. The second disk image 312 includes a translated partition table 340 with CHS addresses corresponding to the second geometry. The linear addresses in the partition tables 322, 340 can remain unchanged. A bootstrap code 342 can be a direct copy of bootstrap code 324 and need not be modified. A volume boot record 346 can be a translated volume boot record wherein the head and sector information is updated to correspond to the second disk geometry. The data sections 348 need not be remapped and can remain identical to data sections 328.

Figure 4:
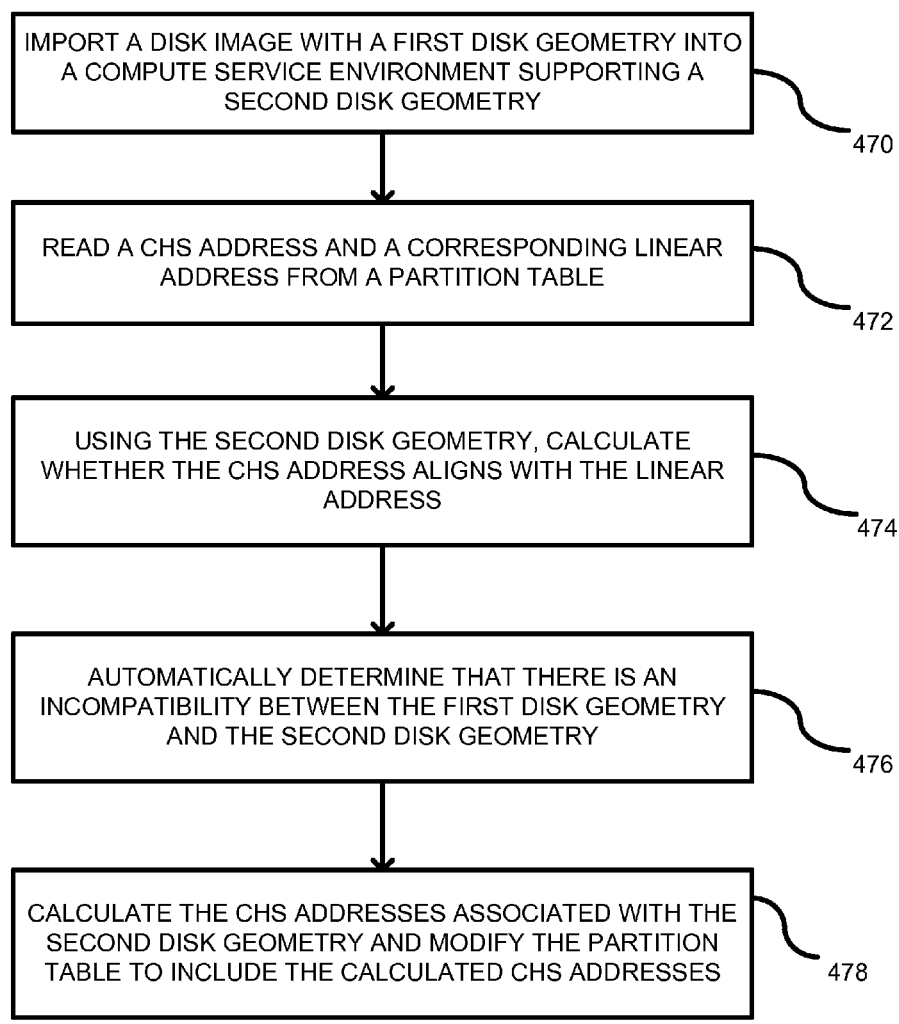
FIG. 4 is a flowchart of a method for modifying a disk geometry to be compatible with a compute service environment.

FIG. 4 is a flowchart of a method for modifying a disk geometry to be compatible with a compute service environment. In process block 470, a disk image having a first disk geometry can be imported into a compute service environment, which supports a second disk geometry. The first and second disk geometries can be different, which is the reason that modifying is needed. In some cases where the disk geometries are identical, a modification need not occur. In process block 472, a CHS address can be read together with a corresponding linear address from the partition table. In process block 474, using a second disk geometry, a calculation is made whether the CHS address aligns with the linear address. By aligning it is meant that the CHS address using the second geometry matches or is equal to the linear address. In process block 476, a determination can be automatically made that there is an incompatibility between the first geometry and the second geometry if the CHS address does not align with the linear address. In process block 478, the CHS addresses associated with the second disk geometry can be calculated in order to modify the partition table.

A specific detailed example of calculating C, H, and S is shown below, wherein the values of H and S are assumed to be at 255 and 63 for the compute service environment for purposes of illustration, but other values can be used.

The following formula can be used for modifying a partition table: C*Number-Of-Heads*Number-Of-Sectors+ H*Number-Of-Sectors+S−1=LBA, where C is the cylinder, H is the head, S is the sector, and LBA is the logical block address. In addition to the equality formula given, there can be an additional constraint that C, H, and S should be positive integers, S should be within a predetermined range (e.g., 1 . . . 63), and H should be within a predetermined range (e.g., 0 . . . 254). Further assumptions are that "%" is the "modulus" or "remainder" operator and Floor(n) means divide and round down. For example, Floor(5/2)=2. The following equations can be used:

$$S = LBA \% 63 + 1$$

$$H = Floor(LBA/63) \% 255$$

$$C = Floor(LBA/16065)$$

First, the C, H, S values are read for the LBA start of each partition. The LBA is divided by 63. The remainder of this is the head number. Because the first head is numbered 1, an additional 1 is added. The LBA is divided by 63 and rounded down. H can then be computed by dividing this value by 255 and the remainder is H. C is determined by dividing the LBA by 16065 and rounding down. The reason for dividing by 16065 is because 255*63=16065. After performing this process, both sides of this equation should be made equal. After that, the new values of C, H, S are written to the disk image and the disk image has now been made compatible with the disk geometry of the compute service environment.

In an alternative embodiment, the linear address can be read from the partition table and used to automatically calculate CHS addresses associated with the second disk geometry. Thus, the process blocks 474 and 476 can be avoided by simply assuming that the geometries are not compatible and modifying the partition table accordingly. In such a case, the CHS addresses need not be read from the partition table.

Figure 5:
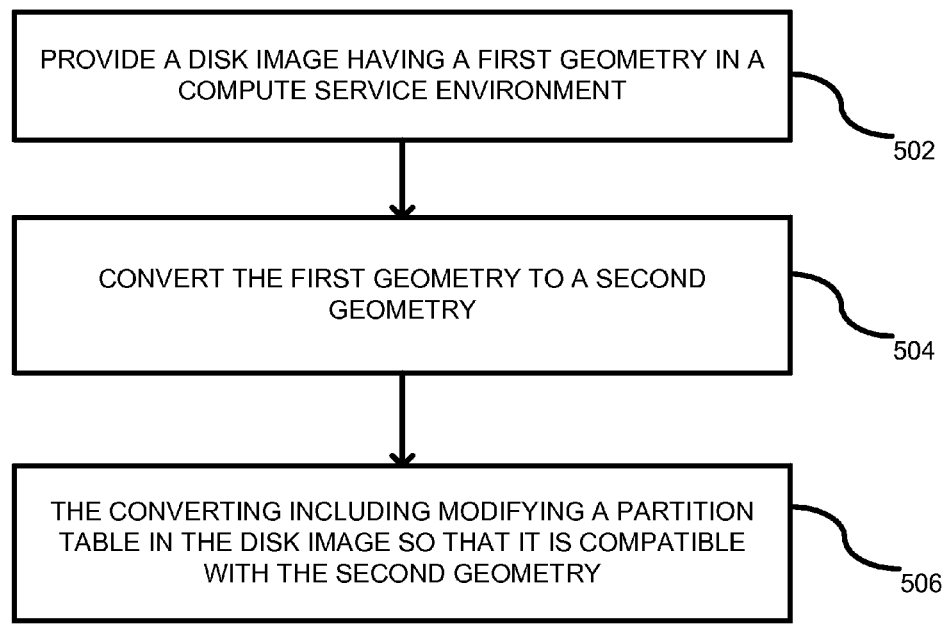
FIG. 5 is a flowchart according to another embodiment for modifying a disk geometry.

FIG. 5 is a flowchart of a method for modifying a disk geometry. In process block 502, a disk image is provided having a first geometry in a compute service environment. One example of providing is through an API request wherein the disk image is supplied. In process block 504, the first geometry is automatically converted to a second geometry, which is associated with the compute service environment. In process block 506, the automatic conversion includes modifying a partition table in the disk image so as to be compatible with the second geometry. The modifying includes reading CHS addresses from the disk image together with corresponding linear addresses (e.g., LBA), calculating corresponding CHS addresses associated with the second disk geometry and replacing the CHS addresses from the disk with the calculated CHS addresses.

Figure 6:
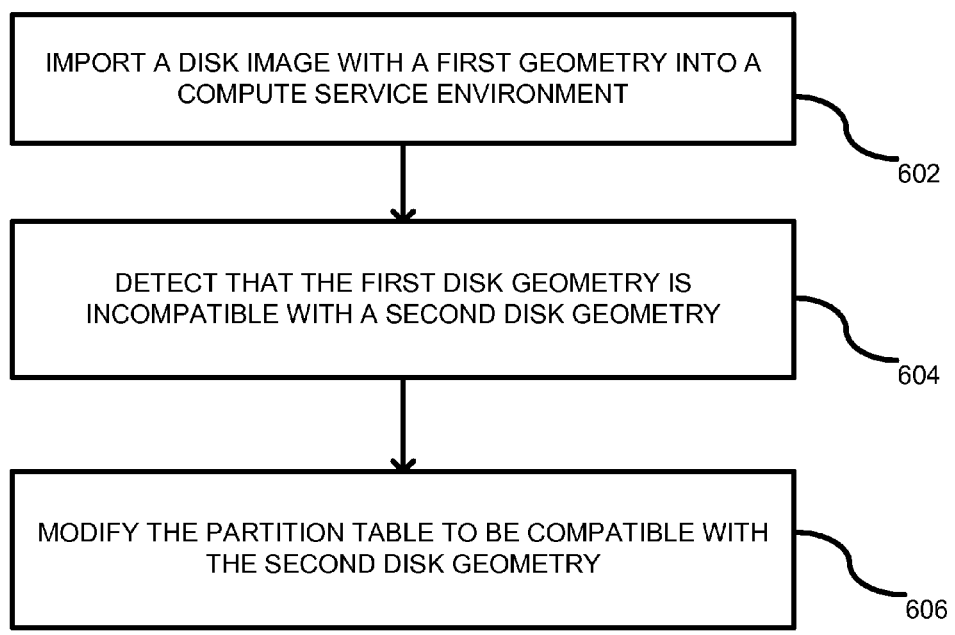
FIG. 6 is a flowchart according to another embodiment for modifying a disk geometry.

FIG. 6 is a flowchart according to another embodiment for modifying a disk geometry. In process block 602, a disk image is imported with a first geometry into the compute service environment. The first geometry is associated with a first CHS addressing scheme. In process block 604, a detection is made that the first disk geometry is incompatible with a second disk geometry. The second disk geometry is associated with a second CHS addressing scheme. The detection can include converting a linear address from the partition table to a CHS address and then comparing that CHS address to a CHS address stored in the partition table. The detection can also be converting the CHS address to the second geometry and comparing the converted CHS address to the linear address. In process block 606, the partition table can be modified to be compatible with the second disk geometry. The modified partition table can then be used to import the disk image into the compute service environment.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer. As should be readily understood, the term computer-readable storage media does not include communication connections, such as modulated data signals.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an Intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of importing a disk image from a client computer external to a compute service environment into the compute service environment, comprising:
    importing the disk image associated with a first disk geometry from the client computer into a storage in the compute service environment through an endpoint of the compute service environment, the compute service environment including a plurality of server computers that form a multi-tenant environment with customers operating independently within the multi-tenant environment, wherein the importing is accomplished through an Application Programming Interface (API) request from the client computer to the compute service environment, wherein the API request includes a content of the disk image so that a first copy of the disk image is received and stored within the storage in the compute service environment, the compute service environment supporting disk images associated with a second disk geometry, different than the first disk geometry;
    reading a cylinder-head-sector (CHS) address and a corresponding linear address from a partition table of the imported disk image that is in the storage in the compute service environment;
    using the second disk geometry, calculating whether the CHS address associated with the second disk geometry aligns with the linear address read from the imported disk image;
    automatically determining that there is an incompatibility between the first disk geometry and the second disk geometry if the CHS address associated with the second disk geometry does not align with the linear address;
    calculating CHS addresses associated with second disk geometry, and modifying the partition table to include the calculated CHS addresses associated with the second disk geometry in response to the determining that there is the incompatibility; and
    storing the second disk geometry within the storage in the compute service environment so that a second copy of the disk image is stored within the compute service environment, but converted into the second disk geometry.

2. The method of claim 1, further including importing the disk image using the modified partition table, which is compatible with the second disk geometry, into the compute service environment.

3. The method of claim 1, wherein calculating includes using a formula C*Number-Of-Heads*Number-Of-Sectors+H*Number-Of-Sectors+S−1=linear address, wherein Number-Of-Heads and Number-Of-Sectors are fixed numbers associated with the second disk geometry.

4. The method of claim 1, wherein automatically determining includes determining that the CHS is unequal to the linear address.

5. The method of claim 1, wherein data sections of the disk image are identical in the second disk geometry as the first disk geometry so that the data sections are copied without changing the logical address associated with each data sector.

6. The method of claim 1, wherein the disk image is a physical hard drive or a virtual hard drive.

7. A method of importing a disk image from a client device external to a compute service environment into the compute service environment, comprising:
    importing the disk image having a first geometry from the client device into the compute service environment through a request to the compute service environment, wherein the request includes contents of the disk image, and wherein the compute service environment includes a plurality of server computers that form a multi-tenant environment and wherein a copy of the disk image from the client device is stored within a storage of the compute service environment; and
    automatically converting the copy of the disk image associated with the first geometry to a second geometry and storing the disk image with the second geometry in the storage of the compute service environment separately from the copy of the disk image with the first geometry, wherein the second geometry is associated with the compute service environment; and
    wherein automatically converting includes modifying a partition table in the disk image so that it is compatible with the second geometry;
    copying data sections of the disk image having the first geometry to the second geometry; and
    wherein logical addresses of the data sections in the disk image in the second geometry are not changed from logical addresses of the data sections from the disk image in the first geometry.

8. The method of claim 7, wherein the modifying includes reading cylinder-head-sector (CHS) addresses from the disk image together with corresponding linear addresses, calculating corresponding CHS addresses associated with second disk geometry, and replacing the CHS addresses from the disk image with the calculated CHS addresses.

9. The method of claim 8, wherein calculating includes using a formula C*Number-Of-Heads*Number-Of-Sectors+H*Number-Of-Sectors+S−1=linear address, wherein Number-Of-Heads and Number-Of-Sectors are fixed numbers associated with the second disk geometry.

10. The method of claim 7, wherein the disk image is a physical hard drive or a virtual hard drive.

11. The method of claim 7, further including changing a volume boot record on the disk image to correspond to the second geometry.

12. The method of claim 7, further including automatically detecting that the first geometry is not compatible with the compute service environment.

13. The method of claim 7, further including importing the disk image with the modified partition table into the compute service environment.

14. A method of importing a disk image external to a compute service environment into the compute service environment, comprising:
  importing, from a disk associated with a client device, the disk image associated with a first disk geometry into the compute service environment, which supports disk images associated with a second disk geometry, the importing resulting in a duplicate copy of the disk image being stored within the compute service environment, the importing resulting from a request from the client device to one of a plurality of server computers within the compute service environment, wherein the request includes a content of the disk image;
  automatically detecting that the first disk geometry is incompatible with the second disk geometry by reading a cylinder-head-sector (CHS) address and a corresponding linear address from the imported disk image using a service executing on a server computer within the compute service environment;
  converting the CHS address into a corresponding address in the second disk geometry;
  checking if the converted CHS address aligns with the corresponding linear address to perform the automatic detecting of incompatibility;
  in response to the detection of incompatibility, modifying a partition table of the disk image to be compatible with the second disk geometry; and
  storing the disk image with the second disk geometry in the compute service environment.

15. The method of claim 14, wherein the first disk geometry is associated with a first cylinder-head-sector addressing scheme that differs from a second cylinder-head-sector addressing scheme associated with the second geometry.

16. The method of claim 14, wherein the disk image is associated with a real or virtual hard drive.

17. The method of claim 14, further including importing the disk image with the modified partition table into the compute service environment as a virtual disk image.

18. The method of claim 14, wherein the automatically detecting that the first disk geometry is incompatible with the second disk geometry includes using the following equation with the second disk geometry and determining whether the equation is true: C*Number-Of-Heads*Number-Of-Sectors+H*Number-Of-Sectors+S−1=linear address.

19. A computer-readable storage having instructions thereon to execute a method of importing a disk image, the method comprising:
  receiving the disk image having a first geometry into a compute service environment through an importation request to the compute service environment to make a duplicate copy of the disk image stored in storage within the compute service environment, wherein the importation request is an Application Program Interface (API) request from a client device external to the compute service environment that includes the disk image;
  testing for compatibility between the first geometry and the second geometry by determining if a cylinder-head-sector (CHS) address is aligned with a linear address;
  automatically converting the disk image having the first geometry to a second geometry, which is associated with the compute service environment, wherein
  automatically converting includes modifying a partition table in the disk image so that it is compatible with the second geometry; and
  storing the disk image within the compute service environment with the second geometry.

20. The computer-readable storage of claim 19, further including importing the disk image with the modified partition table into the compute service environment as a virtual disk image.

21. An apparatus for importing a disk image, comprising:
  a compute service environment supporting a first disk geometry, the compute service environment including a plurality of host server computers operating as a multi-tenant environment; and
  an import tool configured to operate on one of the plurality of host server computers within the compute service environment that automatically imports a disk image from a client device outside of the compute service environment through an endpoint of the compute service environment, the disk image being part of a request from the client device to the compute service environment and configured to detect that the disk image is an incompatible disk image having a second disk geometry and that reconfigures a partition table in the disk image so as to be compatible with the first disk geometry, wherein the import tool is configured to perform the detection of incompatibility by comparing whether a cylinder-head-sector (CHS) address is aligned with a linear address, and wherein the import tool stores the disk image having the second disk geometry within the compute service environment.

22. The apparatus of claim 21, wherein the import tool reads a linear address and a CHS address and calculates whether the addresses match using the second disk geometry.

* * * * *